US007020485B2

(12) United States Patent
Dathe et al.

(10) Patent No.: US 7,020,485 B2
(45) Date of Patent: Mar. 28, 2006

(54) ELECTRONIC CIRCUIT WITH IMPROVED CURRENT STABILIZATION

(75) Inventors: Lutz Dathe, Dresden (DE); Karl-Heinz Sandig, Dresden (DE); Dietmar Eggert, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 590 days.

(21) Appl. No.: 10/324,806

(22) Filed: Dec. 20, 2002

(65) Prior Publication Data

US 2004/0198402 A1 Oct. 7, 2004

(30) Foreign Application Priority Data

Aug. 29, 2002 (DE) ................................ 102 39 813

(51) Int. Cl.
*H04B 1/38* (2006.01)

(52) U.S. Cl. .................. 455/550.1; 455/512; 455/572; 455/574; 330/254; 327/359

(58) Field of Classification Search ................ 455/512, 455/550.1, 572, 574; 327/359, 356, 530; 361/18, 86; 330/254, 278; 326/121, 108; 323/316

See application file for complete search history.

(56) References Cited

U.S. PATENT DOCUMENTS 4,302,719 A * 11/1981 Mattfeld ..................... 323/316
4,554,503 A 11/1985 Kasperkovitz
5,182,477 A * 1/1993 Yamasaki et al. ........... 327/356
5,517,152 A * 5/1996 Miki et al. .................. 327/530
5,642,071 A * 6/1997 Sevenhans et al. ......... 327/359
5,977,828 A 11/1999 Hu et al.
6,201,674 B1 3/2001 Warita et al.
6,265,898 B1 7/2001 Bellaouar
6,339,711 B1 * 1/2002 Otaka et al. ................ 455/572
6,429,742 B1 8/2002 Franca-Neto
6,594,504 B1 * 7/2003 Grasset .................... 455/550.1
6,753,708 B1 * 6/2004 Koch et al. ................. 327/112
2002/0027475 A1 3/2002 Belot
2004/0257114 A1 * 12/2004 Hanneberg et al. ........... 326/86

FOREIGN PATENT DOCUMENTS

DE 3203913 2/1982
EP 0610621 8/1993

* cited by examiner

*Primary Examiner*—Lana Le
(74) *Attorney, Agent, or Firm*—Meyertons Hood Kivlin Kowert & Goetzel, P.C.; B. Noël Livlin

(57) ABSTRACT

An electronic circuit with an improved current stabilization operating in an RF transceiver or receiver, e.g. in a wireless local area network system, and a corresponding method is provided for generating a supply current and supplying the generated supply current to at least two subunits of the electronic circuit. The at least two subunits are connected in parallel to each other. Each of the subunits receives an input voltage at an input transistor in the first one of at least two parallel current paths of the subunit. Each subunit stabilizes the current through the input transistor by means of a control circuit a second current path of the subunit and a common voltage output terminal is connected to each subunit for outputting a voltage. The provided technique may allow for detecting maximum values or generating absolute values.

51 Claims, 4 Drawing Sheets

ELECTRONIC CIRCUIT WITH IMPROVED CURRENT STABILIZATION

BACKGROUND OF THE INVENTION

1. Field of the Invention

The invention generally relates to electronic circuits for processing voltages that may be used in units or subunits of communication systems such as WLAN (Wireless Local Area Network) systems.

2. Description of the Related Art

A wireless local area network is a flexible data communication system implemented as an extension to, or as an alternative for, a wired LAN. Using radio frequency (RF) or infrared technology, WLAN systems transmit and receive data over the air, minimizing the need for wired connections. Thus, WLAN systems combine data connectivity with user mobility. Most WLAN systems use spread spectrum technology, a wide-band radio frequency technique developed for use in reliable and secure communication systems. The spread spectrum technology is designed to trade-off bandwidth efficiency for reliability, integrity and security.

One element in wireless communication systems are RF transceivers. Today, RF transceivers are often provided as integrated circuits and the realization of RF transceivers in highly integrated circuits may be a requirement for applications such as those in wireless local area networks and in the cellular telephony to achieve very high dynamic range and very high frequency on the one hand and a low power consumption and a reduction in the passive components on the other hand.

One possibility to satisfy these requirements may be to build RF transceivers in CMOS (Complementary Metal Oxide Semiconductor) technology. The CMOS technology may offer low power consumption and a high level of integration.

The central device in such technologies is the MOSFET (Metal Oxide Semiconductor Field Effect Transistor) transistor. It is a three or four terminal device that draws no power from an input signal and allows for very fast switching. The fourth terminal is connected to the substrate and is called the bulk.

FIG. 1 shows a typical electronic circuit that may act as an absolute value generator and comprises a current source 100 and two p-channel MOSFET transistors 110, 140. The current source 100 is connected to the source terminals of the p-channel MOSFET transistors for supplying the current to the transistors. Further, the source terminal of each transistor is connected to its bulk terminal. The electronic circuit of FIG. 1 further comprises two input terminals 120, 130 wherein one is connected to the gate of the first transistor 110 and the other is connected to the gate of the second transistor 140 to provide respective input voltages. The drain terminals of the transistors 110, 140 are connected to a ground line to provide a common ground level. An output terminal 150 is provided at a point connecting the current source 100 with the source terminals of the transistors 110, 140. It can further be seen that the transistors 110, 140 are connected in parallel to each other.

The shown electronic circuit of FIG. 1 is disadvantageously affected by a poor accuracy in particular if small voltages, i.e., $V_{peak}<V_{gs}-V_{thr}$ and large voltages, i.e., $V_{peak}>(V_{gs}-V_{thr})*1.414$ are processed. When for instance a large signal is delivered to one of the two input terminals 120, 130 and the other input terminal receives a small signal, one transistor turns off ($V_{gs}<V_{thr}$) while the other has to carry twice the current: $V_{gs}\cong 1.414*V_{gs}(0V)$. This situation may results in an additional level shift caused by nonlinear changes of a gate source voltage and may undesirably change the value of the voltage of the output terminal 150.

Therefore, the conventional electronic circuits do often not meet the requirements of accuracy, operating speed and precision.

SUMMARY OF THE INVENTION

An improved electronic circuit, improved wireless LAN receiver and operation method are provided that may allow for high operating speed, high precision and high accuracy.

In one embodiment, there is provided an electronic circuit that comprises a current supply unit adapted to generate a supply current, and at least two subunits that are connected in parallel to each other and are further connected to the current supply unit. Each of the subunits comprises at least two parallel current paths, wherein a first one of the at least two parallel current paths comprises an input transistor that is connected to receive an input voltage of the respective subunit. A second one of the at least two parallel current paths comprises a control circuit that is adapted to stabilize the current through the input transistor in the first current path. The subunits are further connected to a common voltage output terminal.

In a further embodiment, there is provided a WLAN (Wireless Local Area Network) receiver that comprises a current supply unit adapted to generate a supply current, and at least two subunits that are connected in parallel to each other and are further connected to the current supply unit. Each of the subunits comprises at least two parallel current paths, wherein a first one of the at least two parallel current paths comprises an input transistor that is connected to receive an input voltage of the respective subunit. A second one of the at least two parallel current paths comprises a control circuit that is adapted to stabilize the current through the input transistor in the first current path. The subunits are further connected to a common voltage output terminal.

In another embodiment, there is provided a method of operating an electronic circuit. The method comprises generating a supply current and supplying the generated supply current to at least two subunits of the electronic circuit. The at least two subunits are connected in parallel to each other. The method further comprises receiving in each of the subunits, an input voltage at an input transistor in a first one of at least two parallel current paths of the subunit. The method further comprises stabilizing in each of the subunits, the current through the input transistor by means of a control circuit in a second one of the at least two parallel current paths of the subunit. Moreover the method comprises outputting a voltage at a common voltage output terminal.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following, and more particular description of the invention as illustrated in the accompanying drawings, wherein.

DETAILED DESCRIPTION OF THE INVENTION

The illustrative embodiments of the present invention will be described with reference to the figure drawings, wherein like elements and structures are indicated with like reference numbers.

Figure 1:
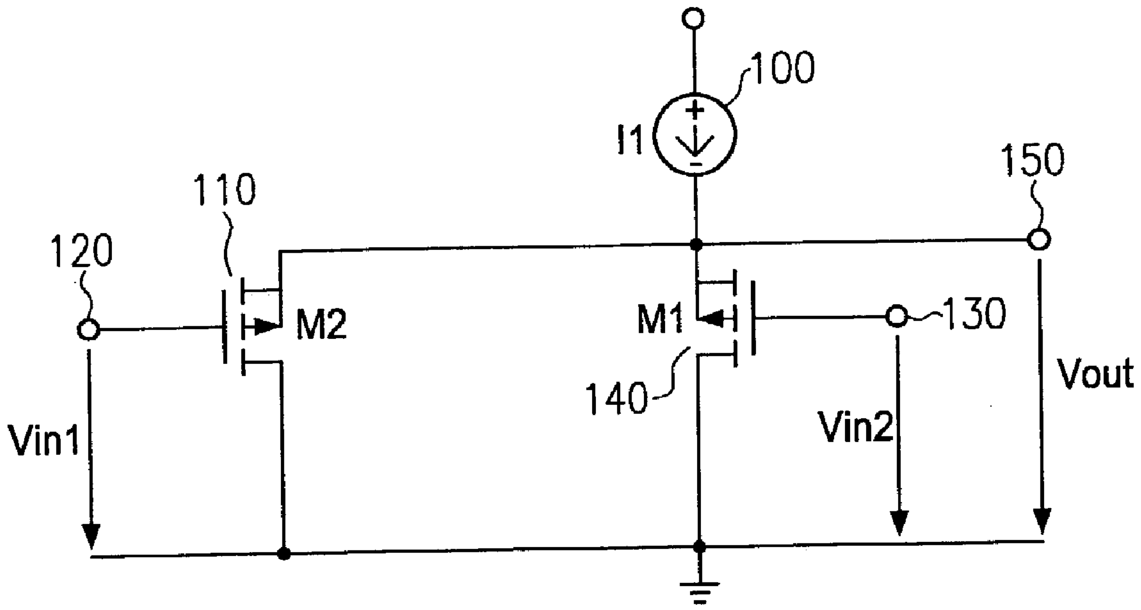
Fig. 1 (Prior Art)
FIG. 1 shows a conventional electronic circuit for processing voltages.
Figure 2:
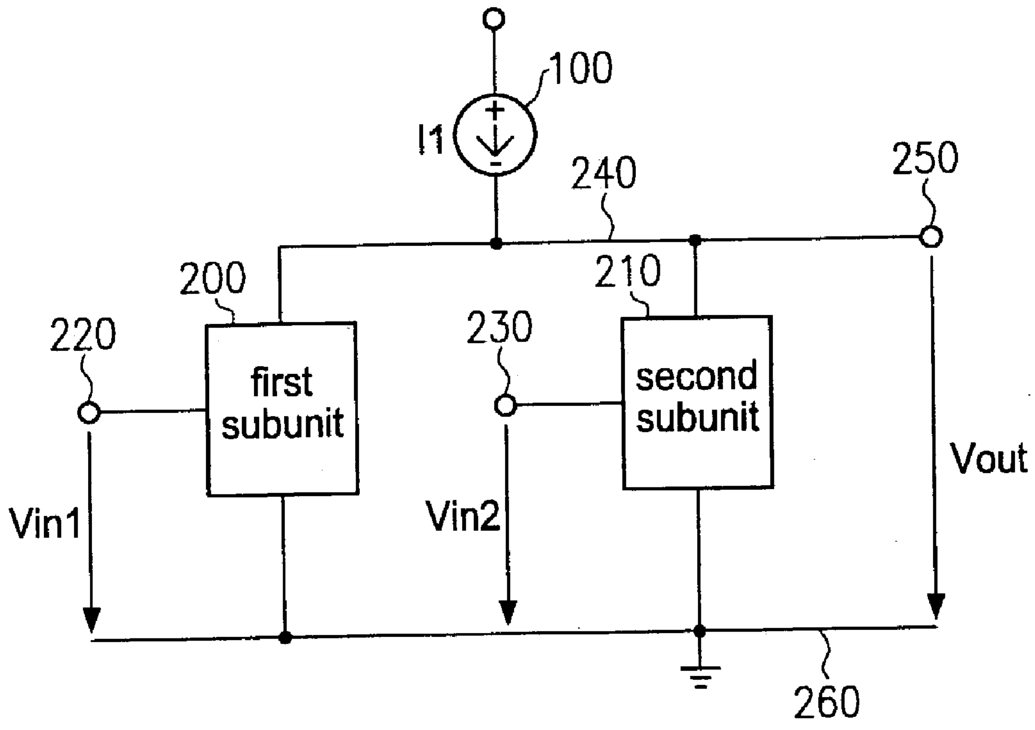
FIG. 2 shows an electronic circuit according to an embodiment comprising two subunits.

Referring now to the drawings, in particular to FIG. 2, an electronic circuit is depicted according to an embodiment. The electronic circuit comprises a current supply unit 100 that is adapted to generate a constant supply current, and two subunits 200, 210 each one depicted as a block. The first subunit 200 is connected to a first input terminal 220 and the second subunit 210 is connected to a second input terminal 230, to receive respective input voltages $V_{in1}$, $V_{in2}$. The subunits 200, 210 are connected in parallel to each other wherein a current line 240 connects the subunits 200, 210 to the current supply unit 100 for distributing the current to the subunits 200, 210. The current line 240 further connects the subunits 200, 210 to a common voltage output terminal 250. A ground line 260 is connected to the subunits 200, 210 to provide a common ground level.

The subunits 200, 210 depicted in FIG. 2 have the same structure. For this reason, the internal construction of only one of the subunits 200, 210 will be described in the following exemplarily in detail with reference to FIG. 3.

Figure 3:
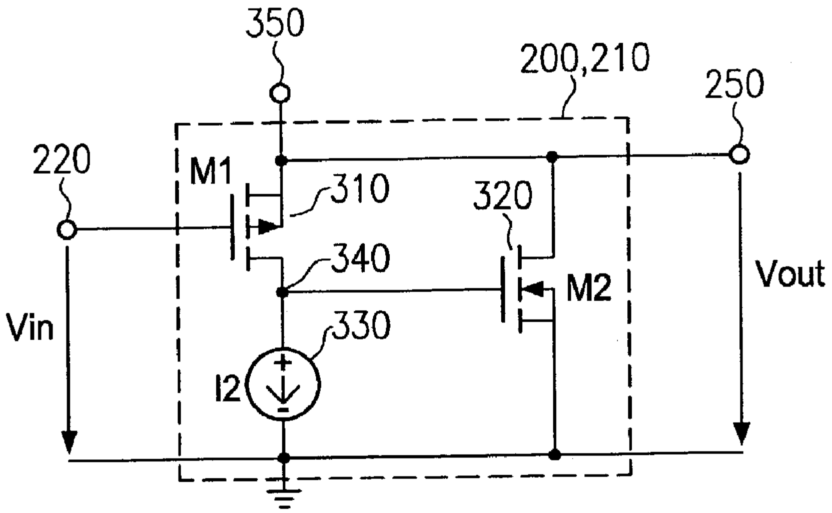
FIG. 3 shows the subunits of FIG. 2 in more detail.

The circuitry of the subunit depicted in FIG. 3 comprises two parallel current paths, wherein the first current path comprises a p-channel MOSFET transistor 310 operating as an input transistor, and a current source unit 330 generating a constant current. The second current path acts as a control circuit for controlling the current through the first current path, and comprises an n-channel MOSFET transistor 320 for this purpose. The transistor 320 will be referred to in the following as control transistor.

The current source unit 330 is provided at a point 340 connecting the gate terminal of the control transistor 320 in the second current path and the drain terminal of the input transistor 310.

The gate terminal of the input transistor 310 is connected to the input terminal 220 to receive the respective input voltage $V_{in}$. The bulk and the source terminals of the input transistor 310 are connected with each other ($V_{bs}$=0V) and are further connected to the second current path formed by the control transistor 320. The two current paths are further connected to the output terminal 250 to provide a subunit output voltage.

Figure 4:
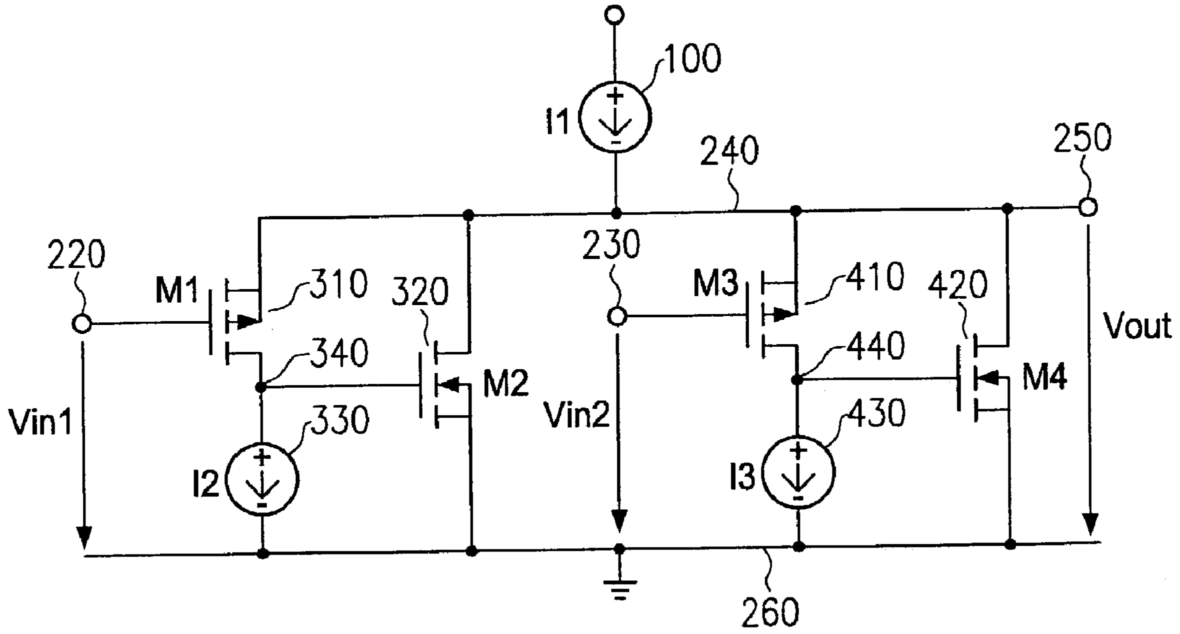
FIG. 4 shows the electronic circuit of FIG. 2 having inserted the subunit circuit of FIG. 3.

The internal circuitry of the subunit of FIG. 3 is inserted into the above-mentioned subunit blocks 200, 210 of FIG. 2, and FIG. 4 shows the resulting detailed electronic circuit.

Discussing now in more detail the circuit of FIG. 4, the gate terminals of the input transistors 310, 410 are connected, as explained above, to respective input terminals 220, 230 to receive respective input voltages, and the drain terminals of the input transistors 310, 410 are connected to points 340, 440 connecting the gates of the control transistors 320, 420 and the current source units 330, 430.

An applied input voltage at one of the input terminals 220, 230 has influence on the channel resistance of the respective input transistor 310, 410, and a current flows through the transistor channel. The current source unit 330, 430 keeps the current through the input transistor 310, 410 constant at a level corresponding to the strength of the constant source current by the control transistor. Simultaneously, a resulting voltage at the gate terminal of the respective control transistor 320, 420 has influence on the resistance of the control transistor 320, 420. Thus, the voltage drop in the first current path controls the current flow in the second current path. The control circuit 320, 420 can be seen as a control loop.

The above-mentioned voltage at the gate of the control transistor 320, 420 varies the control transistor channel resistance and therefore, the current through the control transistor 320, 420 varies such that the current through the entire subunits 200, 210 can change although the current through the input transistor 310 is kept stable.

The difference between that part of the current delivered by the current supply unit 100 that is distributed to the subunit 200, 210, and the current flowing through the respective input transistor channel 310, 410 of this subunit 200, 210 is routed through the control transistor 320, 420 in the second current path of the subunit 200, 210.

Thus, an input voltage $V_{in1}$, $V_{in2}$ at each input terminal 220, 230 of the respective subunits 200, 210 effects an adaptation of the related input transistor channel resistance of the respective input transistor 310, 410, and current through the respective first current path can flow. The current through the respective first current path of each subunit 200, 210 effects a voltage at the gate terminal of the respective control transistor 320, 420, which influences the channel resistance of the control transistor 320, 420 and, therefore, the current through the respective control transistor 320, 420 in the second current path assists in varying the subunit currents while keeping the current through the input transistor 310, 410 in the first current path stable.

At the end, the sum of the current through the respective first and second current path of each subunit 200, 210 is equal to the current distributed to the respective subunits, and the sum of the current through the subunits 200, 210 is equal to the current generated by the current supply unit 100.

By means of the current line 240, subunits are interrelated to provide a common output voltage of the electronic circuit at the circuit output terminal 250.

Figure 5:
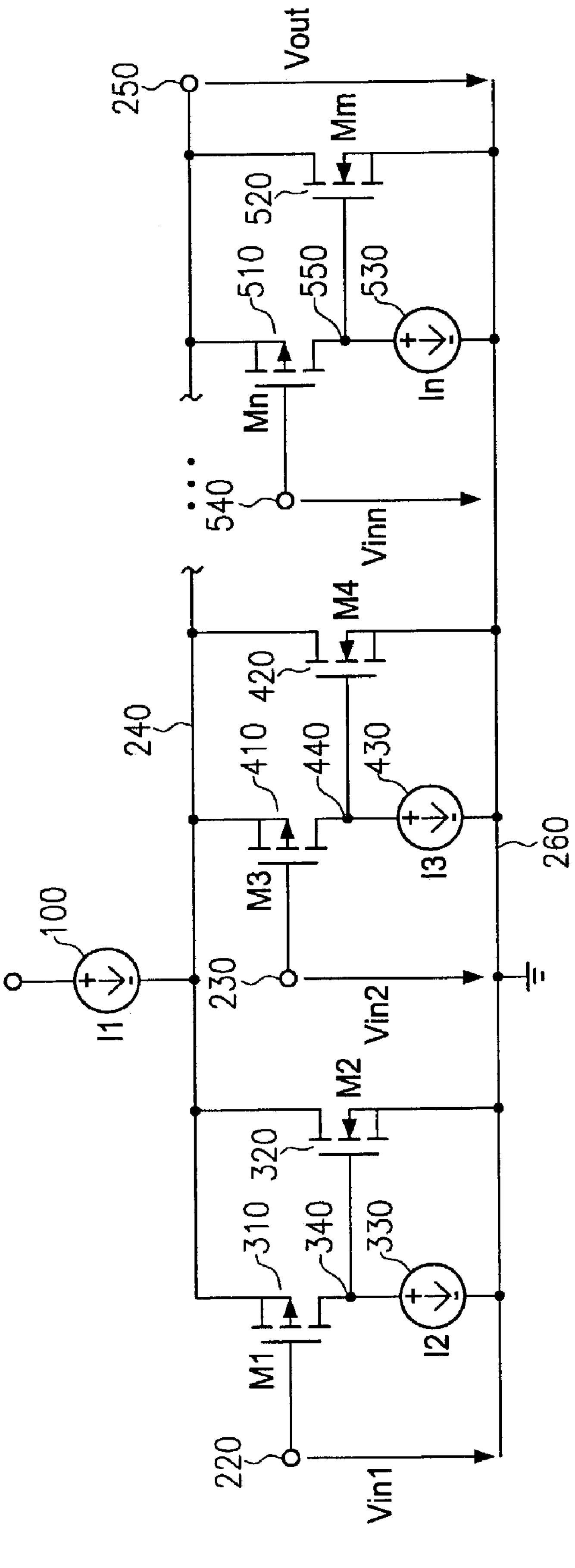
FIG. 5 shows an electronic circuit according to another embodiment having more than two subunits.

Turning now to FIG. 5 which illustrates another embodiment, the figure shows the detailed construction of an electronic circuit similar to that of FIG. 4, having an increased number n of subunits. Therefore, the electronic circuit of FIG. 5 differs from the electronic circuit of FIG. 4 by the number of input terminals of the electronic circuit.

Because of the parallel construction of the electronic circuit, the number of the input terminals 310, 410, 510 can be adapted to any required number of input voltages, whereby only the value of the supply current of the supply current unit 100 has to be adapted. The number of input terminal may be only restricted by the current flow capability of the acting n-channel transistor, when a large input is applied.

As mentioned before, the supply current unit 100 delivers a constant supply current $I_{supply}$ to the subunits. Assuming, the electronic circuit of FIG. 5 comprises a number n of subunits. The current through the first current path of each subunit i may be specified as $I_{i1}$ and the current through the associated second current path of the respective subunit is specified as $I_{i2}$. Further assuming, i is a variable that counts from 1 to n, then the calculation of the supply current delivered by the current supply unit 100 can be expressed as follows:

$$I_{supply} = \sum_{i=1}^{n} (I_{i1} + I_{i2}) = \text{constant}$$

Figure 6:
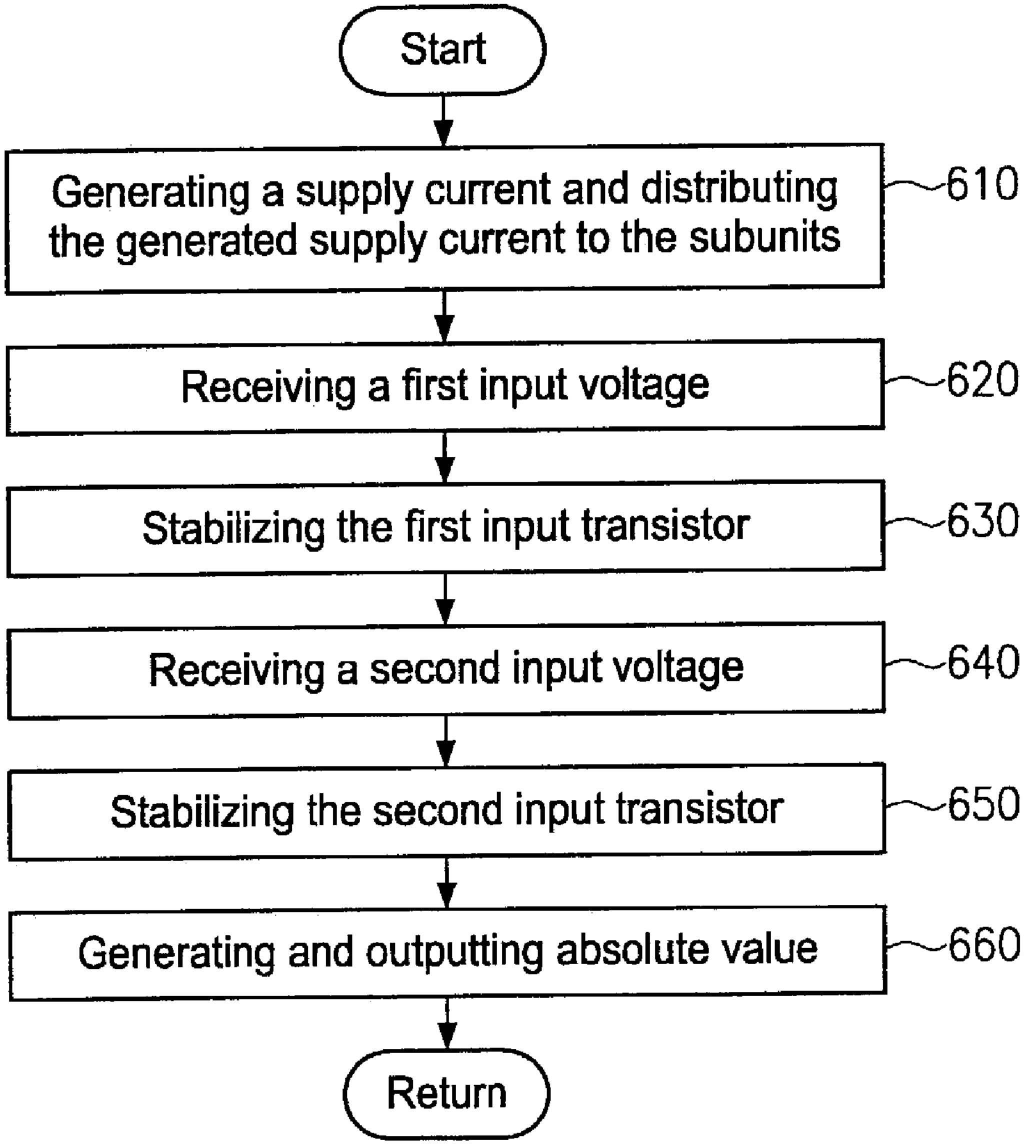
FIG. 6 is a flowchart illustrating the process of a current stabilization according to an embodiment.

FIG. 6 is a flowchart relating to the embodiment of FIG. 4 that comprises two subunits 200, 210. The flowchart of FIG. 6 illustrates the process of operating the electronic circuit leading to an improved current stabilization. The process starts with step 610 wherein a constant supply current is generated and the generated supply current is distributed to the subunits 200, 210.

In step 620, a first input voltage $V_{in1}$ is received, and step 630 is provided for stabilizing the first input transistor 310 that receives the input voltage in step 620. The next step of the illustrated flowchart is the step 640, wherein a second input voltage $V_{in2}$ is received. Similar to step 630, step 650 stabilizes the second input transistor 410.

The last step of the sequence of operating the electronic circuit with an improved current stabilization is step 660 of generating and outputting an absolute value of the input voltages received in step 620 and 640.

In another embodiment, the sequence of operating the electronic circuit, may differ in the order of the above-described steps. In particular, step 640 and step 650 may be performed prior to the steps 620 and 630.

In a further embodiment, the sequence of operating the electronic circuit may be modified such that the steps 620 and 640 of receiving the input voltages and the steps 630 and 650 of stabilizing the respective input transistors may be performed simultaneously.

In yet another embodiment, the process of FIG. 6 may be supplemented with further receiving and stabilizing steps to allow for operating more than two subunits.

As apparent from the foregoing description, all of the embodiments, as described, may advantageously provide high accuracy, high precision and improved operating speed, because the input with the most significant input voltage is biased by a constant current and a modulation of gate source voltage is avoided.

The arrangements may have the advantage to allow magnitude measurements of the applied signals, and the applied signals may be differential as well as single ended.

The arrangements may further have the advantage that additional level shifts are avoided, because the p-channel transistors used as input transistors 310, 410, 510 have an enhanced input transconductance due to the control circuits.

The above described embodiments may offer the advantage that the gate to source voltage drop $V_{gs}$ of the input transistors 310, 410, 510 is constant because the source to substrate voltage drop $V_{bs}$ remains unchanged by means of shorting the source and the substrate terminal ($V_{bs}$=0V), also referred as bulk terminal.

The provided techniques may further offer the advantage that the current through the input transistor 310, 410, 510 with applied peak voltage remains unchanged by the control loop.

The arrangements may provide the advantage that the current of the input transistors 310, 410, 510 which are turned off when a large input signal is applied, can flow through the control transistor 320, 420, 520.

Moreover the manufacturing may be simplified because the electronic circuit uses a decreased number of component parts since additional circuitry for post processing the output signal can be avoided. Therefore, the above-described embodiments may, in effect, reduce the production costs.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. For instance, while the above described embodiments use the current supply unit 100 for generating the constant supply current, other embodiments may be provided with a resistor that is connected to a voltage source for generating that constant supply current.

In addition, those areas in which it is believed that those of ordinary skill in the art are familiar, have not been described herein in order not to unnecessarily obscure the invention described herein. Accordingly, it is to be understood that the invention is not to be limited by the specific illustrative embodiments, but only by the scope of the appended claims.

What is claimed is:

1. An electronic circuit comprising:

a current supply unit adapted to generate a supply current; and at least two subunits connected in parallel to each other and connected to said current supply unit, wherein each of said subunits comprises at least two parallel current paths, wherein a first one of said at least two parallel current paths comprises an input transistor connected to receive an input voltage of the respective subunit, and a second one of said at least two parallel current paths comprises a control circuit adapted to stabilize the current through the input transistor in said first current path, and wherein said subunits are further connected to a common voltage output terminal.

2. The electronic circuit of claim 1, wherein said current supply unit is adapted to generate a constant supply current.

3. The electronic circuit of claim 1, wherein said current supply unit is a resistor connected to a voltage source.

4. The electronic circuit of claim 1, wherein said subunits are of the same structure.

5. The electronic circuit of claim 1, wherein said current supply unit is connected to said subunits by means of a current line for distributing said supply current to said subunits such that the strength of said supply current is equal to the sum of the strengths of the currents through said subunits.

6. The electronic circuit of claim 5, wherein said current line is connected to said common voltage output terminal.

7. The electronic circuit of claim 6, wherein said current line is connected to each of said current paths of each of said subunits.

8. The electronic circuit of claim 1, comprising a ground line connected to each of said current paths of each of said subunits for providing a common ground level.

9. The electronic circuit of claim 1, wherein the first current path in each of said subunits comprises:

a current source unit for generating a stabilized current through the input transistor of the respective subunit.

10. The electronic circuit of claim 9, wherein said current source unit is adapted to generate a constant current.

11. The electronic circuit of claim 9, wherein in each of said subunits, said current source unit is connected to a point connecting a control terminal of a control transistor in the respective second current path of the subunit and an input terminal of the input transistor in the respective first current path of the subunit.

12. The electronic circuit of claim 1, wherein the control circuit in each of said subunits comprises a control transistor connected to the first current path of the respective subunit for stabilizing the current through the input transistor in said first current path.

13. The electronic circuit of claim 12, wherein said control transistor is connected to the input transistor in the respective first current path.

14. The electronic circuit of claim 12, wherein said control transistor is connected to the respective first current path at a control terminal of the control transistor.

15. The electronic circuit of claim 14, wherein said control terminal of said control transistor is connected to an input terminal of said input transistor.

16. The electronic circuit of claim 12, wherein said control transistor is further connected to a current line connecting said current supply unit with said subunits.

17. The electronic circuit of claim 16, wherein said control transistor is connected to said current line at an input terminal of said control transistor.

18. The electronic circuit of claim 12, wherein said control transistor is a field effect transistor.

19. The electronic circuit of claim 18, wherein said field effect transistor is an n-channel MOSFET (Metal Oxide Semiconductor Field Effect Transistor) transistor.

20. The electronic circuit of claim 12, wherein said control transistor is connected for operating as a control loop.

21. The electronic circuit of claim 1, comprising a current line connected to said current supply unit, wherein said current line is further connected to an output terminal of the input transistors in the first current paths of said subunits.

22. The electronic circuit of claim 21, wherein each of said input transistors is a field effect transistor having a bulk terminal, and said output terminals of each of said input transistors are further connected to the bulk terminal of the respective input transistor.

23. The electronic circuit of claim 1, wherein each of said input transistors is a field effect transistor.

24. The electronic circuit of claim 23, wherein said field effect transistors are p-channel MOSFET (Metal Oxide Semiconductor Field Effect Transistor) transistors.

25. The electronic circuit of claim 1, adapted for being operated in an RF (Radio Frequency) transceiver.

26. The electronic circuit of claim 1, adapted for being operated in a WLAN (Wireless Local Area Network) receiver.

27. The electronic circuit of claim 26, adapted for being operated in an absolute value generator of said WLAN receiver.

28. The electronic circuit of claim 26, adapted for being operated in a maximum value detector of said WLAN receiver.

29. The electronic circuit of claim 1, adapted for processing differential input signals.

30. The electronic circuit of claim 1, wherein the input transistor in each of said subunits is connected to operate as source follower.

31. A WLAN (Wireless Local Area Network) receiver comprising:

a current supply unit adapted to generate a supply current; and at least two subunits connected in parallel to each other and connected to said current supply unit, wherein each of said subunits comprises at least two parallel current paths, wherein a first one of said at least two parallel current paths comprises an input transistor connected to receive an input voltage of the respective subunit, and a second one of said at least two parallel current paths comprises a control circuit adapted to stabilize the current through the input transistor in said first current path, and wherein said subunits are further connected to a common voltage output terminal.

32. A method of operating an electronic circuit, the method comprising:

generating a supply current and supplying the generated supply current to at least two subunits of said electronic circuit, said at least two subunits being connected in parallel to each other;

in each of said subunits, receiving an input voltage at an input transistor in a first one of at least two parallel current paths of the subunit;

in each of said subunits, stabilizing the current through the input transistor by means of a control circuit in a second one of said at least two parallel current paths of the subunit; and outputting a voltage at a common voltage output terminal connected to each of said subunits.

33. The method of claim 32, wherein generating said supply current comprises generating a constant supply current.

34. The method of claim 32, wherein generating said current supply unit comprises:

distributing said supply current to said subunits such that the strength of said supply current is equal to the sum of the strengths of the currents through said subunits.

35. The method of claim 32, wherein said voltage is output at a current line used for supplying the generated supply current to the subunits.

36. The method of claim 32, further comprising:

providing a common ground level to each of said current paths of each of said subunits.

37. The method of claim 32, wherein stabilizing the current through the input transistor in each subunit further comprises:

operating a current supply unit in the first current path of the respective subunit.

38. The method of claim 37, wherein stabilizing the current comprises:

generating a constant current through the respective input transistor.

39. The method of claim 37, wherein stabilizing the current further comprises:

controlling a control transistor in the respective second current path based on a signal received from an input terminal of the respective input transistor.

40. The method of claim 32, wherein stabilizing the current through the input transistor comprises:

operating a control transistor in the control circuit, connected to said first current path.

41. The method of claim 40, wherein operating the control transistor comprises:

operating a control loop.

42. The method of claim 40, wherein said control transistor is a field effect transistor.

43. The method of claim 42, wherein the field effect transistor is an n-channel MOSFET (Metal Oxide Semiconductor Field Effect Transistor) transistor.

44. The method of claim 32, wherein each of said input transistors is a field effect transistor.

45. The method of claim 44, wherein each of said field effect transistors is a p-channel MOSFET (Metal Oxide Semiconductor Field Effect Transistor) transistor.

46. The method of claim 32, being operated in an RF (Radio Frequency) transceiver.

47. The method of claim 32, being operated in a WLAN (Wireless Local Area Network) receiver.

48. The method of claim 47, being operated in an absolute value generator of said WLAN receiver.

49. The method of claim 47, being operated in a maximum value detector of said WLAN receiver.

50. The method of claim 32, adapted to receive differential input voltages at the input transistor.

51. The method of claim 32, wherein said input transistors in each of said subunits are operated as source followers.

* * * * *